US009428395B2

(12) United States Patent
Dubois et al.

(10) Patent No.: US 9,428,395 B2
(45) Date of Patent: Aug. 30, 2016

(54) METHOD FOR PREPARING GRAPHENE (71) Applicant: COMMISSARIAT A L'ENERGIE ATOMIQUE ET AUX ENE ALT, Paris (FR)

(72) Inventors: Lionel Dubois, Verrens-Arvey (FR); Serge Gambarelli, Saint Egreve (FR); Ashok Nanjundan, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 14 days.

(21) Appl. No.: 14/364,970

(22) PCT Filed: Dec. 11, 2012

(86) PCT No.: PCT/IB2012/057180
§ 371 (c)(1),
(2) Date: Jun. 12, 2014

(87) PCT Pub. No.: WO2013/088341
PCT Pub. Date: Jun. 20, 2013

(65) Prior Publication Data
US 2014/0335011 A1   Nov. 13, 2014

(30) Foreign Application Priority Data

Dec. 12, 2011   (FR) ...................... 11 61471

(51) Int. Cl.
| | | |
|---|---|---|
| C01B 31/04 | (2006.01) |
| B82Y 30/00 | (2011.01) |
| B82Y 40/00 | (2011.01) |
| C25B 1/00 | (2006.01) |

(52) U.S. Cl.
CPC ............ C01B 31/0492 (2013.01); B82Y 30/00 (2013.01); B82Y 40/00 (2013.01); C01B 31/0446 (2013.01); C01B 31/0476 (2013.01); C25B 1/00 (2013.01)

(58) Field of Classification Search
CPC .......... C01B 31/0446; C01B 31/0492; B82Y 40/00; B82Y 30/00; C25B 1/00
USPC ....................................... 423/448
See application file for complete search history.

(56) References Cited

U.S. PATENT DOCUMENTS

2010/0147188 A1 * 6/2010 Mamak ............. B82Y 30/00
106/31.13

FOREIGN PATENT DOCUMENTS

WO   2011 119961   9/2011

OTHER PUBLICATIONS

Pan, et al., Highly Ordered, Millimeter-Scale Continuous, Single-Crystalline Graphene Monolyaer Formed on Ru (0001), Adv. Mater. 2008; 20: 1-4.*
Yang, et al., Synthesis of graphene nanosheet film with attached amorphous carbon nanoparticles by their simultaneous electrodeposition, Carbon 2010; 48: 1644-1673.*
Zhang, M. et al., "Fast synthesis of $SnO_2$/graphene composites by reducing graphene oxide with stannous ions", Journal of Materials Chemistry, Royal Society of Chemistry, vol. 21, No. 6, pp. 1673-1676, (Feb. 14, 2011) XP002678971.
Wang, X. et al., "A $SnO_2$/graphene composite as a high stability electrode for lithium ion batteries", Carbon, vol. 49, No. 1, pp. 133-139, (Jan. 2011) XP002678973.
Wang, Z. et al., "Technology ready use of single layer graphene as a transparent electrode for hybrid photovoltaic devices", Physica E, vol. 44, No. 2, pp. 521-524, (Oct. 3, 2011) XP028107034.
Zhu, C. et al., "Facile synthesis of two-dimensional graphene/$SnO_2$/Pt ternary hybrid nanomaterials and their catalytic properties", Nanoscale, vol. 3, No. 10, pp. 4376-4382, (Oct. 2011) XP002679069.
Li, Y. et al., "Preparation of $SnO_2$-Nanocrystal/Graphene-Nanosheets Composites and Their Lithium Storage Ability", Journal of Physical Chemistry C, vol. 114, No. 49, pp. 21770-21774, (Dec. 16, 2010) XP002679068.
Zhao, B. et la., "Bivalent tin ion assisted reduction for preparing graphene/$SnO_2$ composite with good cyclic performance and lithium storage capacity", Electrochimica Acta, vol. 56, No. 21, pp. 7340-7346, (Jun. 13, 2011) XP028263007.
International Search Report Issued Apr. 18, 2013 in PCT/IB12/057180 Filed Dec. 11, 2012.

* cited by examiner

*Primary Examiner* — Daniel C McCracken
(74) *Attorney, Agent, or Firm* — Oblon, McClelland, Maier & Neustadt, L.L.P.

(57) ABSTRACT

The present invention relates to a method for preparing graphene substantially free of contamination by metallic, magnetic, organic and inorganic impurities, and also to the use of the resulting graphene for the production of transparent electrodes, batteries, electron-acceptor or electron-donor materials, in particular in photovoltaic systems, photovoltaic panels, transistor channels, in particular in electronics, nonlinear emitters or absorbers of infrared photons, current-conducting electrodes, anti-static coatings, chemical detectors, vias and interconnections in electronics, current-conducting cables, and solar cells.

18 Claims, 9 Drawing Sheets

METHOD FOR PREPARING GRAPHENE

CROSS REFERENCE TO RELATED APPLICATIONS

The present application is a 35 U.S.C. §371 national stage patent application of International patent application PCT/IB2012/057180, filed on Dec. 11, 2012, published as WO/2013/088341 on Jun. 20, 2013, the text of which is incorporated by reference, and claims the benefit of the filing date of French application no. 11 61471, filed on Dec. 12, 2011, the text of which is also incorporated by reference.

The present invention relates to a process for preparing graphene that is substantially free of contamination with metallic, magnetic, organic and mineral impurities, and also to the use of the graphene obtained by this process for producing transparent electrodes, batteries, electron donor or acceptor materials especially in the photovoltaic sector, photovoltaic panels, transistor channels especially in electronics, nonlinear emitters or absorbers of infrared photons, current-conducting electrodes, antistatic coatings, chemical detectors, electronic interconnections and vias, current-conducting cables and solar cells.

Graphene is a two-dimensional (monoplanar) carbon crystal, which, when stacked, constitutes graphite. Graphene is found in the natural state in graphite crystals, where it is present in the form of a stack of sheets. Several processes for preparing graphene from graphene oxide have appeared in recent years.

Graphene oxide, also known as graphitic acid or graphite oxide, is an oxygenated graphite compound which contains about 50% by mass of oxygen. Its reduction to graphene generally takes place by using hydrazine or transition metal compounds such as iron.

For example, the article by O. C. Compton and S. T. Nguyen, *Small*, 2010, 6, pages 711-723, describes the reduction of an aqueous dispersion of graphene oxide with hydrazine hydrate in the presence of poly(sodium 4-styrenesulfonate) (PSS) as amphiphilic surfactant. The article by S. Stankovich, D. A. Dikin, R. D. Piner, K. A. Kohlhaas, A. Kleinhammes, Y. Jia, Y. Wu, S. T. Nguyen and R. S. Ruoff, *Carbon*, 2007, 45, pages 1558-1565, describes the reduction of an aqueous suspension of graphene oxide sheets exfoliated with hydrazine for obtaining a carbon-based material having a high specific surface area and consisting of thin graphene sheets. Zhuang-Jun Fan, Wang Kai, Jun Yan, Tong Wei, Lin-Jie Zhi, Jing Feng, Yue-ming Ren, Li-Ping Song and Fei Wei, *ACS nano*, 2011, vol. 5, No. 1, pages 191-198, describe the synthesis of graphene nanosheets from graphene oxide in the presence of metallic iron. The graphene nanosheets contain residual iron.

The drawback of these methods is that they leave traces of impurities either of reducing agent (hydrazine) or metallic impurities (iron). Furthermore, they are not all capable of removing the impurities present in the starting graphite, or resulting from the method for synthesizing the graphene oxide used. For example, in the case of reduction with hydrazine, contamination with manganese ions originating from the potassium permanganate used for the synthesis of the graphene oxide is possible.

Recently, the article by B. Zhao, G. Zhang, J. Song, Y. Jiang, H. Zhuang, P. Liu and T. Fang, *Electrochimica Acta*, 2011, pages 7340-7346, described the preparation of composite materials in which tin oxide is deposited on the surfaces of graphene, by coprecipitation of graphene oxide (in suspension) with tin chloride ($SnCl_2$), in isopropanol. The resulting material is a composite material in which tin oxide ($SnO_2$) is deposited on the surfaces of graphene. This type of graphene-tin oxide composite material was also synthesized by performing a homogeneous precipitation of $SnCl_4$ in a suspension of graphene oxide using urea, followed by reduction of the graphene oxide with hydrazine under microwave irradiation (X. Zhu, Y. Zhu, S. Murali, M. D. Stoller and R. S. Ruoff, *Journal of Power Sources*, 2011, 196, pages 6473-6477). The graphene obtained is a composite material in the form of platelets decorated on the surface with tin oxide ($SnO_2$).

Irrespective of the process used, the graphene obtained always comprises traces of magnetic metal elements or organic or mineral compounds adsorbed onto its surface. These impurities modify or, at the very best, totally disrupt the intrinsic properties of the material: reduction of the electrical conductivity, modification of the nature of the mode of electron transport, modification of the magnetic properties. In certain cases of doping, the addition of certain "impurities" to graphene, for instance silicon, may be beneficial. However, this doping is possible only if the starting graphene is free of contamination.

Moreover, in the field of catalysis, it is essential for the graphene which will serve as catalyst support to be free of any metallic, magnetic, organic or mineral impurities. Such impurities may have intrinsic catalytic properties, and their presence in the graphene may degrade the selectivity of the catalyst by catalyzing, for example, parasite reactions.

There is thus a real need for a process for preparing graphene that is free of any trace of contamination with organic and mineral impurities, overcoming the drawbacks of the prior art.

In particular, there is a real need for a process for preparing graphene that is free of any trace of contamination with metallic, magnetic, organic and mineral impurities,
  which is inexpensive and easy to perform;
  which is reproducible in large amount (on a scale of several kilograms);
  which does not require sophisticated equipment;
  which makes it possible to obtain a high-quality $sp^2$ graphene, and/or
  which makes it possible to obtain a graphene with a high specific surface area.

The aim of the present invention is, precisely, to satisfy these needs by providing a process for preparing graphene that is substantially free of contamination with metallic, magnetic, organic and mineral impurities, i.e. a graphene whose degree of contamination with metallic, magnetic, organic and mineral impurities is not more than 0.01% by mass, preferably not more than 0.001% by mass and more preferentially not more than 0.0001% by mass, relative to the total mass of the graphene, characterized in that a) a dispersion of graphene oxide (GO) in a solvent or a mixture of solvents is reacted with at least one tin compound and at least one acidic compound, the pH of the dispersion being less than 7, b) the graphene obtained in step a) is subjected to at least one acidic washing step performed at a pH <5.

The process of the invention thus makes it possible to prepare a graphene that is substantially free of contamination with metallic, magnetic, organic and mineral impurities. The expression "graphene that is substantially free of contamination with metallic, magnetic, organic and mineral impurities" means a graphene whose degree of contamination with metallic, magnetic, organic and mineral impurities is not more than 0.01% by mass; preferably, the process of the invention makes it possible to prepare a graphene whose degree of graphene is not more than 0.001% by mass and more preferentially not more than 0.0001% by mass relative to the total mass of the graphene. The impurities may originate from the starting material (graphite or graphite oxide) or from the graphene synthesis process. Their nature is variable. The mineral impurities may be metal ions (of transition metals or other metals) optionally in oxide form or attached to the surface of the graphene. The organic impurities may be small molecules that are capable of interacting (for example via hydrophobic bonding) with the graphene surface. In this respect, mention may be made of aromatic compounds.

The nature of the magnetic impurities is diverse. They may, however, be classified as mineral and organic magnetic impurities.

In the case of mineral magnetic impurities:
  they may originate either from the starting material (graphite) which is generally of natural origin (mine) and, consequently, like petroleums or coals, often polluted with transition metals (iron, vanadium, etc.) or even traces of lanthanides/actinides;
  they may be provided by the graphene synthesis process. In this case, their nature depends on the process. These impurities are usually manganese, iron, etc.

In the case of organic magnetic impurities:
  they may be defects associated with the graphene structure (broken C—C bonds, etc.). In this case, it is a radical of C.° type in which the lone electron may (or may not) be delocalized over the entire graphene structure. The defects have numerous origins. In the starting material, these defects may be associated with all the carbon-based materials (charcoal, graphite). The defects may also result from the graphene synthesis process, for example in the case where the reduction of the GO is incomplete. Finally, during the dispersing of the material in a solvent by sonication, this may induce, if no precautions are taken, cleavage of the C—C bond and the constitution of associated radicals;
  in the case where the graphene production methods use organic compounds, some of these compounds may form stable radicals that are liable to remain attached to the graphene;
  such impurities may also exist within the starting graphite.

In the context of the present invention, the term "graphene" denotes a graphene having from one sheet to a stack of ten sheets of graphite, preferably from one sheet to a stack of five sheets of graphite.

The graphene obtained via the process of the invention is of high-quality $sp^2$. Specifically, graphene owes its electrical and mechanical properties to the existence of $sp^2$ hybridized carbon atoms. The more $sp^3$ hybridized carbons the material contains, the more its properties are degraded. These $sp^3$ carbons originate either from the synthesis of the graphene or from its degradation.

In the context of the present invention, the term "dispersion" means a suspension or dispersion of two separate phases: a dispersion medium (a solvent or a mixture of solvents) and a dispersed phase (graphene oxide). The dispersion or suspension is said to be stable when the dispersed phase (graphene oxide) does not sediment out. The dispersion is said to be homogeneous when the phase dispersed in the dispersion medium is not visible to the naked eye or to an optical microscope. When the dispersion is homogeneous, it may also be considered as a "solution". Thus, the term "dispersion" includes dispersions, suspensions and also solutions.

For the purposes of the present invention, the term "alkyl" means a linear, branched or cyclic, saturated or unsaturated, optionally substituted carbon-based radical, comprising 1 to 12 carbon atoms. Examples of saturated, linear or branched alkyls that may be mentioned include methyl, ethyl, propyl, butyl, pentyl, hexyl, octyl, nonyl, decyl, undecyl and dodecyl radicals and the branched isomers thereof. Cyclic alkyls that may be mentioned include cyclopropyl, cyclobutyl, cyclopentyl, cyclohexyl, bicyclo[2.1.1]hexyl and bicyclo[2.2.1]heptyl radicals. Examples of unsaturated cyclic alkyls that may be mentioned include cyclopentenyl and cyclohexenyl. The unsaturated alkyls, also known as "alkenyl" or "alkynyl", contain, respectively, at least one double or triple bond. In this respect, examples that may be mentioned include ethylenyl, propylenyl, butenyl, pentenyl, hexenyl, acetylenyl, propynyl, butynyl, pentynyl and hexynyl, and the branched isomers thereof. For the purposes of the invention, the alkyl group including alkenyl and alkynyl groups may be optionally substituted with one or more hydroxyl groups; one or more alkoxy groups; one or more halogen atoms chosen from fluorine, chlorine, bromine and iodine atoms; one or more nitro groups ($—NO_2$); one or more nitrile groups (—CN); one or more aryl groups, with the alkoxy and aryl groups as defined in the context of the present invention.

The term "aryl" generally denotes a cyclic aromatic substituent comprising from 6 to 20 carbon atoms. In the context of the invention, the aryl group may be monocyclic or polycyclic. As a guide, mention may be made of phenyl, benzyl and naphthyl groups. The aryl group may be optionally substituted with one or more hydroxyl groups, one or more alkoxy groups, one or more halogen atoms chosen from fluorine, chlorine, bromine and iodine atoms, one or more nitro groups ($—NO_2$), one or more nitrile groups (—CN), one or more alkyl groups, with the alkoxy and alkyl groups as defined in the context of the present invention.

The term "alkoxy" means an alkyl group, as defined above, linked via an oxygen atom (—O-alkyl).

As indicated, the dispersion may comprise a solvent or a mixture of solvents chosen from:
  solvents having a nonzero dipole moment, i.e. a dipole moment of at least 6 Debye, chosen from water, pyrrolidinone; a $C_1$-$C_{12}$ alkylpyrrolidinone such as methyl-2-pyrrolidinone (NMP), octylpyrrolidinone;

dimethylformamide (DMF), dimethylacetamide; dimethyl sulfoxide (DMSO); acetonitrile; tetrahydrofuran (THF); hexamethylphosphoramide (HMPA);

mineral acids chosen from hydrochloric acid; sulfuric acid; nitric acid; perchloric acid;

organic acids chosen from formic acid; lactic acid; benzoic acid; methanesulfonic acid; para-toluenesulfonic acid (PTSA); trifluoroacetic acid; trichloroacetic acid; α-naphthol; picric acid;

or a mixture thereof.

When at least one of the solvents of the dispersion medium is water, the dispersion or solution is said to be aqueous.

According to a preferred embodiment of the invention, the dispersion of graphene oxide in step a) is aqueous. Preferably, the dispersion medium is water.

The graphene oxide used as starting material in the process of the invention may be synthesized from natural graphite powder (for instance the product sold by the company Bay Carbon Inc.) or from synthetic graphite (for instance the product sold by the company Nano Armor), according to the modified Hummer procedure as described by O. C. Compton and S. T. Nguyen in *Small,* 2010, 6, 711-723. The origin of the graphite has an influence on the final size of the graphene sheets, but not on the way in which the graphene preparation process proceeds. Thus, the modified Hummer procedure may be used both with GOs whose sheets have a size of the order of a centimeter and with GOs whose particle size is of the order of ten nanometers. The term "size" means the length and width of the sheets.

Graphene oxide, when obtained in powder form, can be dispersed directly in the reaction solvent. When graphene oxide is obtained in dispersion form in a solvent chosen from those mentioned previously, the dispersion is used in its existing form in the process.

The graphene oxide (GO) concentration of the dispersion in step a) depends on the capacity of the reaction solvent to separate the GO sheets. It may range, for example, from a few milligrams per liter to several hundred grams per liter. Preferably, the graphene oxide (GO) concentration in the dispersion may be between $1\times10^{-4}$ and $1\times10^{3}$ g/L, advantageously between $1\times10^{-3}$ and $9\times10^{2}$ g/L and more advantageously between $1\times10^{-3}$ and $1\times10^{2}$ g/L, limits inclusive.

In the process of the invention, the graphene oxide dispersion can react with at least one compound comprising an element chosen from tin and zinc. The element may be, for example, in metallic form, in salt form or in oxide form.

Preferably, the process of the invention is performed with a tin compound. The tin compound may be chosen from:
tin metal;
tin(II) salts chosen from tin chloride; tin sulfate; tin nitrate; tin perchlorate;
tin tetraphenylborate; tin phosphate; tin acetate; tin oxalate;
or a mixture thereof.

Tin metal or salts thereof (tin(II)) is used as reducing agent. Tin has several advantages: the tin(IV) salts generated by the reaction are very soluble, for example in concentrated acids (in particular hydrochloric), and the tin(II) ion plays a catalytic role in the reduction of graphene oxide (GO). Finally, tin(II) salts are sufficiently reductive to reduce GO without the need for a co-reducing agent, for instance hydrazine. This is an important advantage of the process of the invention, since, because the removal of the co-reducing agent at the end of the process is difficult, it is liable to irreversibly pollute the graphene.

The amount of tin compound used in the process of the invention is from 0.1 to 5 equivalents, preferably from 1 to 5 equivalents and more preferentially from 1 to 2 equivalents, limits inclusive, relative to the amount of oxygen to be removed from the graphene oxide.

Besides the graphene oxide (GO) dispersion and the compound chosen from tin and zinc, preferably tin, at least one acidic compound is used in the process of the invention. The acidic compound may be the same as the solvent(s) or different. It is preferably chosen from:

mineral acids chosen from hydrochloric acid; sulfuric acid; nitric acid; perchloric acid; phosphoric acid;

organic acids chosen from formic acid; lactic acid; benzoic acid; methanesulfonic acid; para-toluenesulfonic acid (PTSA); trifluoroacetic acid; trichloroacetic acid; α-naphthol; picric acid;

or a mixture thereof.

The acidic compound may be used pure or diluted as an aqueous solution to a concentration of at least 0.1 mol·L$^{-1}$. The addition of the acidic compound may take place either before, simultaneously with or after the addition of the tin compound.

It has been found that, in the process of the invention, when the pH of the dispersion in step a) is maintained at a pH <7, in particular at a pH <5, and/or when the acidic washing(s) of step b) are also performed at a pH <5, in particular at a pH <3, more particularly at a pH <1, the contamination of the graphene with metallic, magnetic, organic and mineral impurities is substantially reduced or even eliminated Thus, in step a), the pH of the dispersion is, in particular, less than 5 and more particularly less than 3. In step b), the washing(s) are performed in particular at a pH <3 and more particularly at a pH <1.

In step a), the reaction may take place at a temperature between 0° C. and the reflux temperature of the solvent. Preferably, the reaction takes place at a temperature between 15 and 40° C. More preferentially, the reaction takes place at room temperature, i.e. at a temperature of 20° C.±5° C.

In step a), the reaction may take place with manual agitation, mechanical or magnetic stirring and/or by ultrasonic agitation. Other agitation means may also be suitable for use.

The reaction time of step a) depends on the degree of conversion of the graphene oxide into graphene. The reaction is advantageously maintained until all of the graphene oxide has been converted into graphene. The reaction of step a) is performed for a time of from 1 minute to 72 hours, for example from 30 minutes to 48 hours, for example from 1 to 24 hours, limits inclusive.

Step a) of the process may be performed chemically or electrochemically.

When the reaction is performed chemically, the reaction progress may be monitored by the color change of the reaction medium: the color of the reaction medium changes from yellow-brown (the color of graphene oxide) to black (the color of graphene).

When the reaction is performed electrochemically, one of the electrodes may be made of an element chosen from tin and zinc, preferably made of a tin compound, more preferentially of tin metal. The reaction progress is then monitored as a function of the intensity of the current circulating between the electrodes. When the intensity of the circulating current becomes zero, the reaction is complete.

Step a) of the process via the electrochemical route may be performed using an acid or an acidic solution as described previously, as conductive medium. During the reaction, hydrogen is liable to be evolved from the electrode of an element chosen from tin and zinc, in particular tin. The potential of said tin electrode is maintained at a negative value relative to the normal hydrogen electrode (NHE), so that all of the metal element chosen from tin and zinc, in particular tin, which can pass into solution in metallic ion form is redeposited in metal form at the electrode. The GO concentrations are the same as those described previously for the chemical route. The end of reaction is indicated by the color changes of the medium (it turns black, for example), and the reduction in the current circulating between the electrodes.

When step a) is performed electrochemically, the tin or zinc compound, preferably tin compound, may be recycled, for example by reducing it to the metallic form or alternatively by using it as an electrode for electrochemically converting the graphene oxide to graphene. In this latter case, tin or the salts thereof act as electrocatalyst. This last variant may make it possible better to control the conversion kinetics of the graphene oxide into graphene and, consequently, to avoid an excessive evolution of heat that might damage the equipment or injure the operator. This is particularly pertinent in the case of a process performed with large amounts (several kilograms) of graphene oxide.

After step a), the graphene may be stored as a dispersion or separated out before being subjected to the acidic washing (s) of step b).

The acidic washing of step b) is advantageously performed with a mineral acid chosen from hydrochloric acid; sulfuric acid; nitric acid; perchloric acid; phosphoric acid. The acid is generally in the form of an aqueous solution whose acid concentration is between that of the pure acid and $0.1 \text{ mol·L}^{-1}$.

The acidic washing(s) of step b) of the process of the invention may optionally be followed by one or more washings with water up to a pH of between 6.5 and 7.5.

After step b), the graphene obtained may be used in its existing form. It may optionally be separated out and/or dried.

During the preparation of the various dispersions used in the context of the present invention, they may be subjected to agitation. Examples of agitation means that may be mentioned include manual agitation, ultrasonication, mechanical stirring or a combination of such techniques. These techniques may necessitate the use of a magnetic stirrer, a magnetic bar, an ultrasonication bath, a mechanical stirrer with rods, paddles, impellers, etc. A person skilled in the art will know how to choose the agitation means that is suited to each case.

After each of the steps a) and b), the graphene may be separated out and/or dried.

The separation may be performed via any separation technique known in this field, for instance filtration and/or centrifugation.

The drying may be performed by any means known in this field, for instance:
freeze-drying,
conductive drying in which the graphene is placed in contact with hot surfaces,
convective drying in which a stream of hot gas, which provides the heat required to evaporate the solvent(s), is sent onto the graphene,
infrared drying in which infrared radiation, whose wavelength may be between the visible range (0.6 micron) and 10 microns, is applied to the graphene,
microwave drying (waves with a frequency between 915 MHz and 2450 MHz), and/or
vacuum drying optionally in the presence of a desiccant: $H_2SO_4$, KOH, $P_2O_5$, silica gel.

The drying may take place via one of the operations mentioned above or by a combination of two or more of these operations.

Depending on the drying conditions, the drying temperature may range from 20° C. to 1000° C., for example from 30 to 80° C., for example from 40 to 60° C., limits inclusive. The drying time may be from 1 to 72 hours and preferably from 1 to 24 hours.

The graphene obtained via the process of the invention is in powder form, in particular in the form of a sparingly dense powder (density<100 $\text{mg·mL}^{-1}$). According to a variant of the invention, the graphene obtained via the process of the invention is in the form of a sparingly dense black powder (density <100 $\text{mg·mL}^{-1}$).

The process of the invention is reproducible and makes it possible to prepare graphene in large amount (on a scale of several kilograms).

Another subject of the present invention is the use of graphene that is substantially free of contamination with metallic impurities, i.e. a graphene whose degree of contamination with metallic, magnetic, organic and mineral impurities is not more than 0.01% by mass, preferably not more than 0.001% by mass and more preferentially not more than 0.0001% by mass, relative to the total mass of the graphene, magnetic, organic and mineral, obtained via the process of the invention, for the preparation of catalysts, catalyst supports, transparent electrodes, batteries (either for storing the lithium or the alkali metal used, or as a conductive adjuvant), electron donor or acceptor materials especially in the photovoltaic sector, photovoltaic panels, transistor channels especially in electronics, spintronic materials, nonlinear emitters or absorbers of infrared photons, current-conducting electrodes, antistatic coatings, chemical detectors, electronic interconnections and vias, current-conducting cables and solar cells.

A subject of the invention is also a process for preparing catalysts, catalyst supports, transparent electrodes, batteries (either for storing the lithium or the alkali metal used, or as a conductive adjuvant), electron acceptor materials especially in the photovoltaic sector, photovoltaic panels, transistor channels especially in electronics, spintronic materials, nonlinear emitters or absorbers of infrared photons, current-conducting electrodes, antistatic coatings, chemical detectors, electronic interconnections and vias, current-conducting cables and solar cells, characterized in that it uses the graphene preparation process according to the invention, said graphene being substantially free of contamination with metallic, magnetic, organic and mineral impurities, i.e. a graphene whose degree of contamination with metallic, magnetic, organic and mineral impurities is not more than 0.01% by mass, preferably not more than 0.001% by mass and more preferentially not more than 0.0001% by mass relative to the total mass of the graphene.

Other advantages and characteristics of the present invention will emerge on reading the examples below, which are given as nonlimiting illustrations, and of the attached figures.

Figure 1:
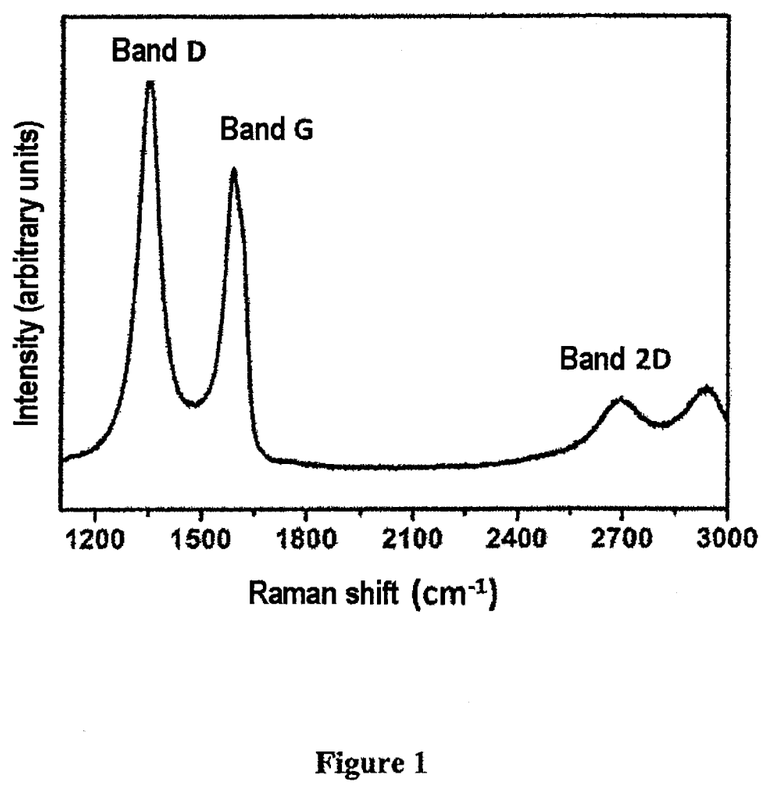
FIG. 1 is the Raman spectrum recorded on the graphene prepared according to Example 1.

FIG. 1 is the Raman spectrum recorded on the graphene prepared according to Example 1 of the invention. The Raman shift, in $\text{cm}^{-1}$, is indicated on the x-axis, and the Raman line intensity is given on the y-axis. This spectrum shows the presence of bands known as D, G and 2D. These bands are characteristic of graphene having a low number of sheets (between 1 and 10), good crystalline quality and few structural defects.

Figure 2:
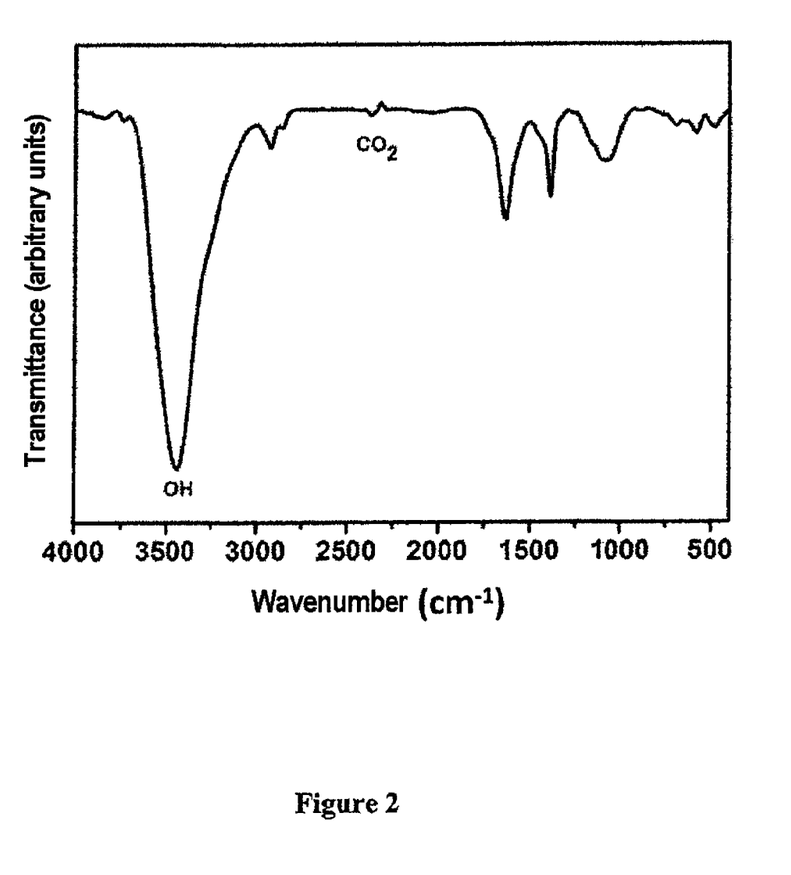
FIG. 2 shows the characterization of the graphene prepared according to Example 1 by Fourier transform infrared spectroscopy.

FIG. 2 shows the characterization of the graphene prepared according to the process of Example 1 of the invention by Fourier transform infrared spectroscopy.

The absorption wavelengths, in $cm^{-1}$, are indicated on the x-axis and the absorbance or transmittance is indicated on the y-axis. The infrared spectrum shows the disappearance of the bands associated with the oxygenated functions present in the GO, i.e. essentially the acidic functions ($\nu \approx 1740$ $cm^{-1}$). The bands labeled OH and $CO_2$ are associated with the experimental conditions and do not belong to the final graphene.

Figure 3:
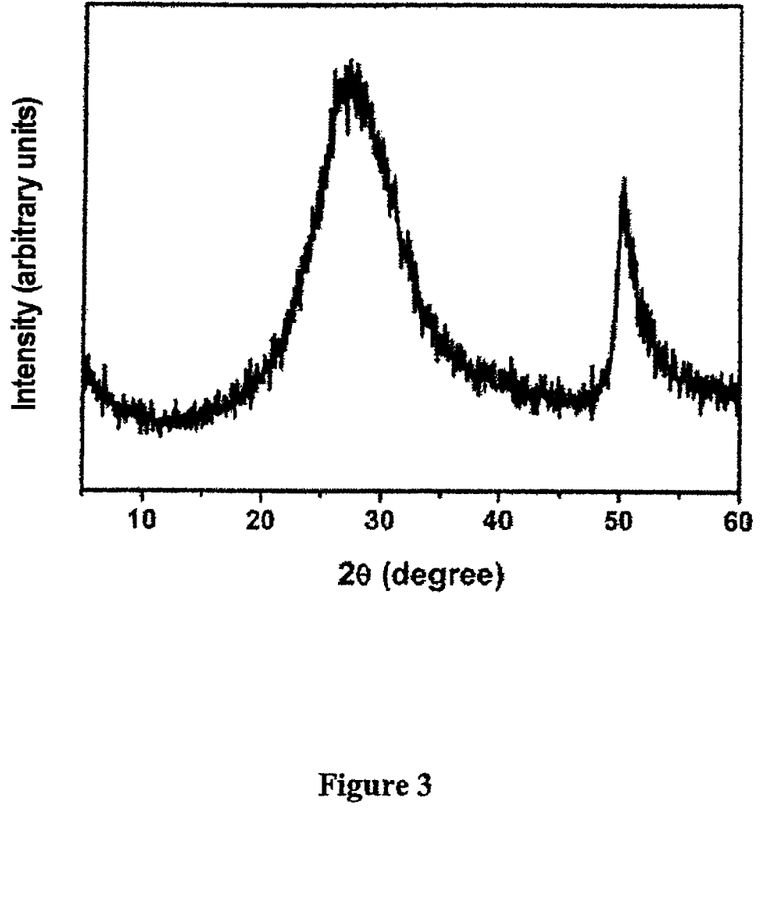
FIG. 3 shows the characterization of the graphene prepared according to Example 1 by powder X-ray diffraction.

FIG. 3 shows the characterization of the graphene prepared according to the process of Example 1 of the invention by powder X-ray diffraction. The position of the 2θ peaks, in degrees, is indicated on the x-axis and the X-ray intensity is indicated on the y-axis. The recorded powder diffractogram clearly shows the disappearance of the initial graphite or graphite oxide. No diffraction peak belonging to tin salts or oxides is present.

Figure 4A:
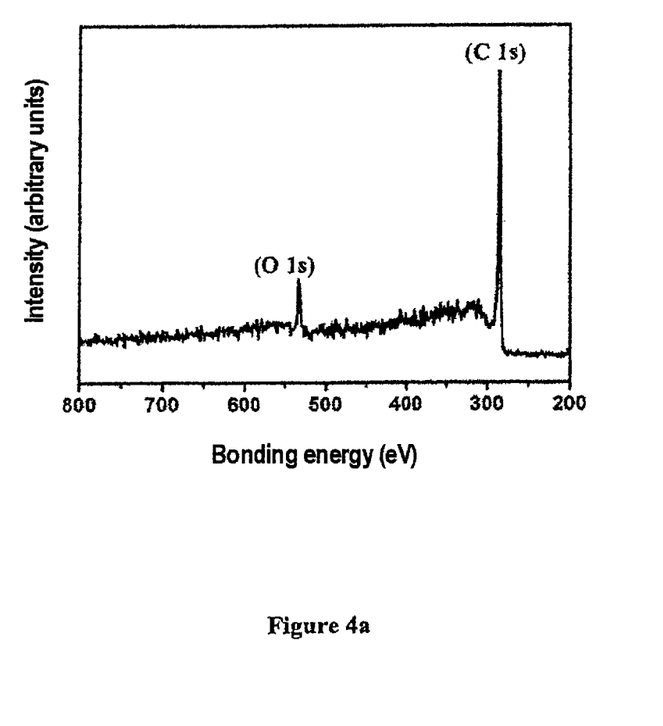
FIGS. 4a-4c show the characterization of the graphene prepared according to Example 1 by X-ray photoelectron spectrometry (XPS).
Figure 4B:
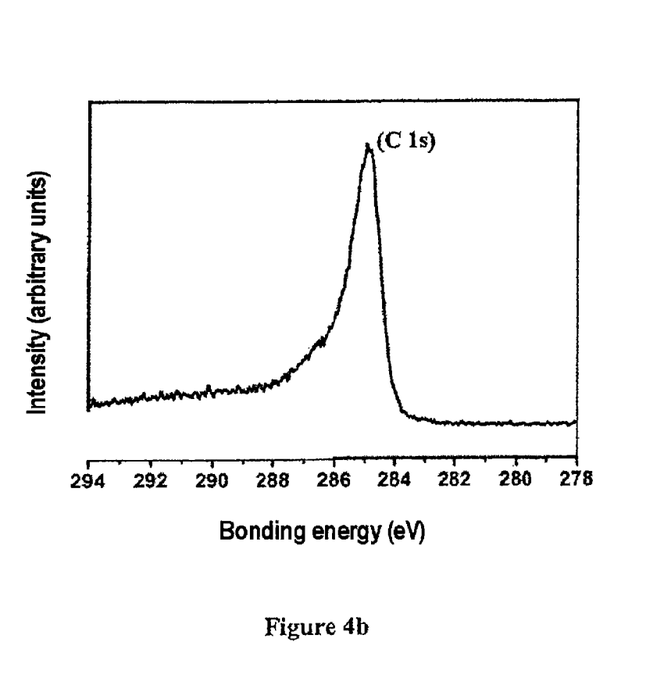
Figure 4C:
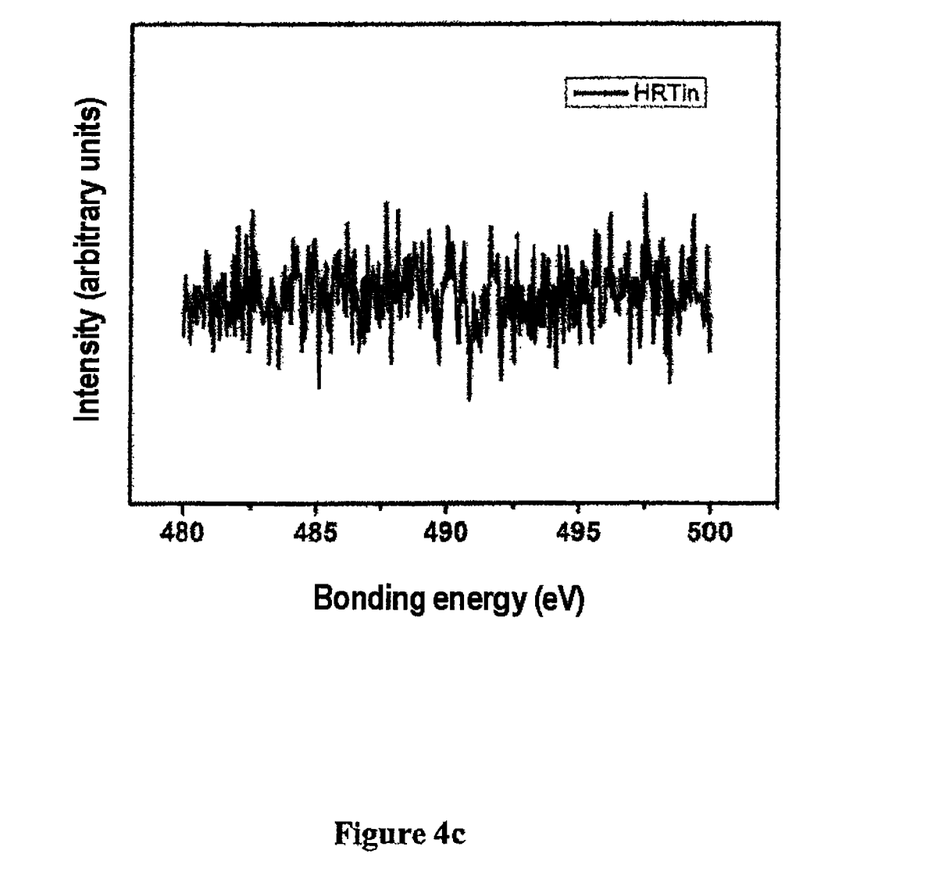

FIGS. 4a-4c show the characterization of the graphene prepared according to the process of Example 1 of the invention by X-ray photoelectron spectrometry (XPS). The radiation intensity (y-axis) is reported as a function of the energy (x-axis) expressed in electron-volts (eV).

The XPS spectrum presented in FIG. 4a shows the presence of two elements in the sample: carbon (largely predominant) and oxygen (residual). The oxygen signal is attributed to the presence of atmospheric water or oxygen adsorbed onto the surface of the graphene.

The XPS spectrum presented in FIG. 4b is the signal recorded in the carbon zone which is representative of the constituent $sp^2$ hybridized carbons of the graphene obtained.

The XPS spectrum presented in FIG. 4c is a magnification of the tin signature zone. It does not show the presence of any peak, attesting to the absence of adsorbed or bound tin compounds in the final graphene.

Figure 5A:
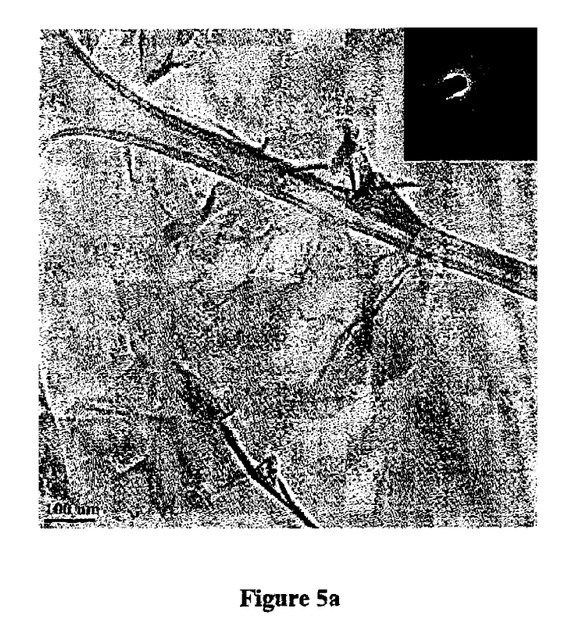
FIGS. 5a and 5b show the characterization of the graphene prepared according to Example 1 by transmission electron microscopy (TEM).
Figure 5B:
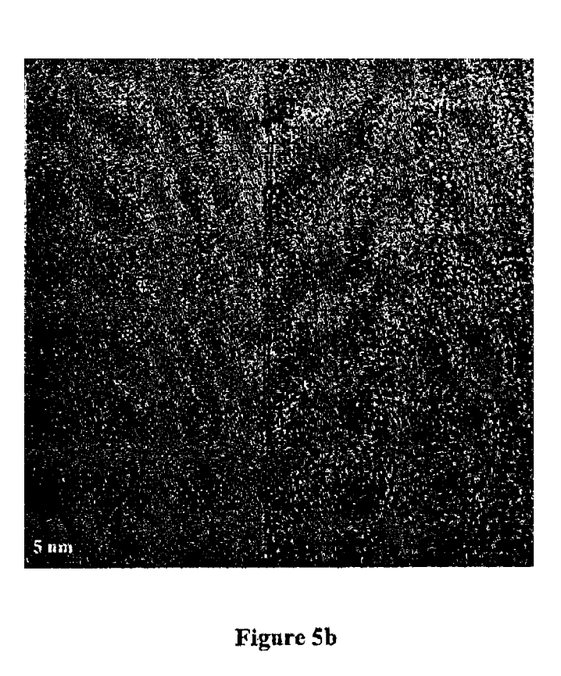

FIGS. 5a and 5b show the characterization of the graphene prepared according to the process of Example 1 of the invention by transmission electron microscopy (TEM).

The TEM images (FIG. 5a) show that the size of the final graphene sheets corresponds to the mean size of the graphite grains used for the synthesis of the starting graphite oxide.

The insert in the image (FIG. 5b) shows an electron diffractogram representative of those recorded on several samples at different places in the final graphene sheet. These diffractograms show perfectly crystalline graphene having few defects, for instance side bonds, holes in the structure or the absence of order. This magnification makes it possible to count the number of constituent graphene layers in the sheets, this number being between 1 and 5 for all the samples produced with the graphene prepared according to the process of the invention.

Figure 6:
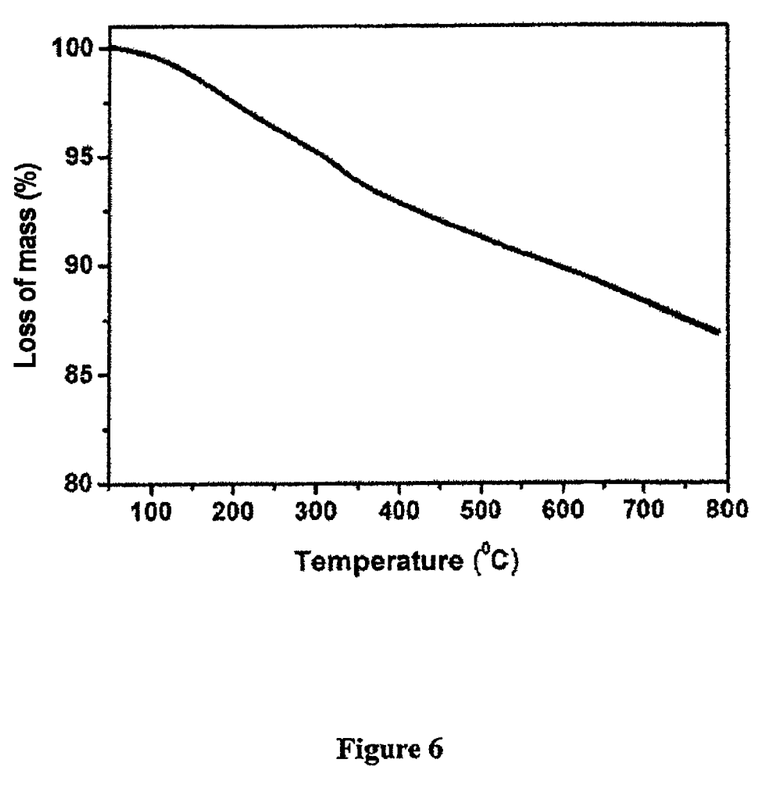
FIG. 6 presents the progress/conversion of graphene oxide into graphene by thermogravimetric analysis (TGA).

FIG. 6 presents the progress/conversion of graphene oxide into graphene by thermogravimetric analysis (TGA). The variation in mass of the sample, expressed as a percentage (y-axis), is measured as a function of its heating temperature expressed in degrees Celsius (x-axis). The thermogravimetric analysis recorded under a nitrogen atmosphere shows a gradual loss of mass of about 12% at 800° C., which corresponds to the loss of the water or oxygen adsorbed onto the surface of the graphene.

Figure 7:
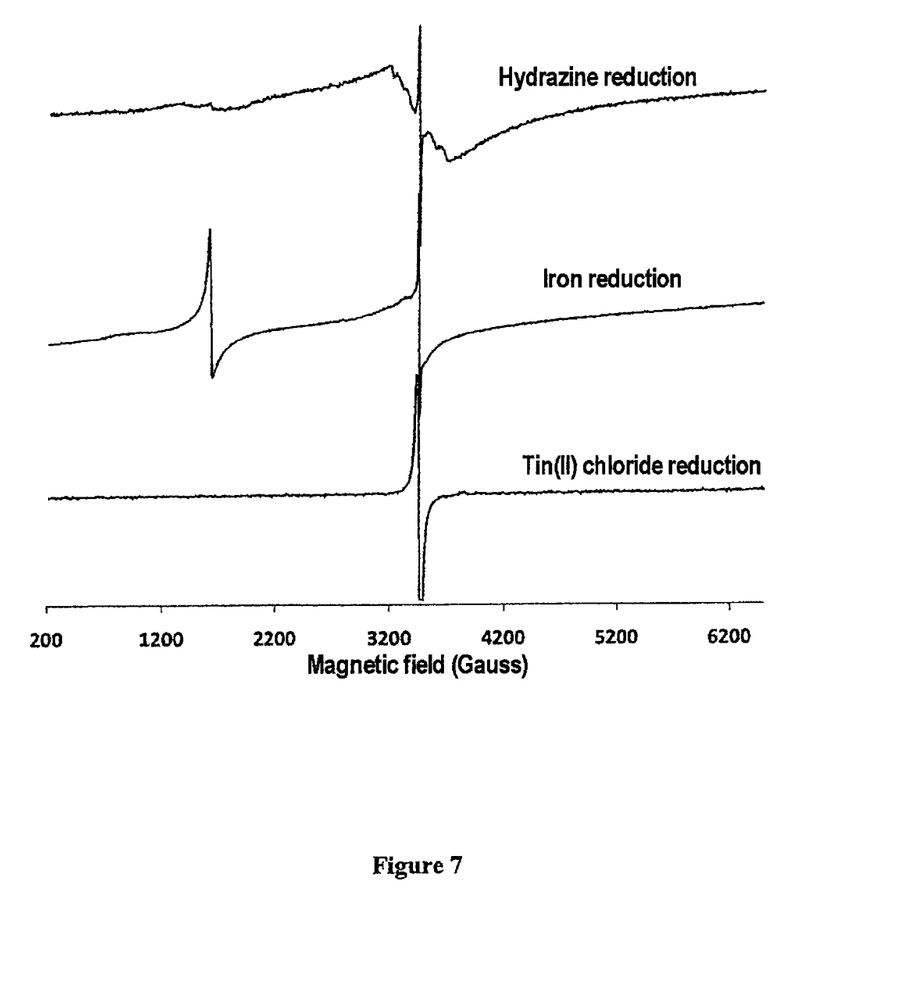
FIG. 7 shows the characterization of the graphene prepared according to Example 1 by magnetic analysis—electron paramagnetic resonance (EPR).

FIG. 7 shows the characterization of the graphene prepared according to the process of Example 1 of the invention by magnetic analysis—electron paramagnetic resonance (EPR). EPR makes it possible to determine and to analyze the paramagnetic species present in a sample. Samples of graphene prepared according to the process of the invention were compared with samples obtained according to "standard" procedures using hydrazine or iron. The spectra were recorded at 4 Kelvin on an EPR spectrometer functioning in the X-ray band. The magnetic field, in Gauss, is indicated on the x-axis.

The graphene prepared according to the process of the invention does not show any trace of paramagnetic metal ions, even though the spectrum presented was amplified along the y-axis. The only signal observed corresponds to the carbon-based paramagnetic species and probably to the graphene conduction electrons.

The samples of graphene obtained by reaction with hydrazine all show two signals: one corresponding to the carbon-based paramagnetic species (fine signal at 3440 Gauss) and a broader signal (of about 1000 to 6000 Gauss) corresponding to manganese ions. These manganese ions originate from the synthesis of the graphite oxide, and hydrazine reduction does not succeed in removing them.

The samples of graphene obtained by reaction with iron show, in addition to the signal corresponding to the carbon-based paramagnetic species, a broader signal (at about 1500 Gauss) characteristic of iron compounds.

Figure 8:
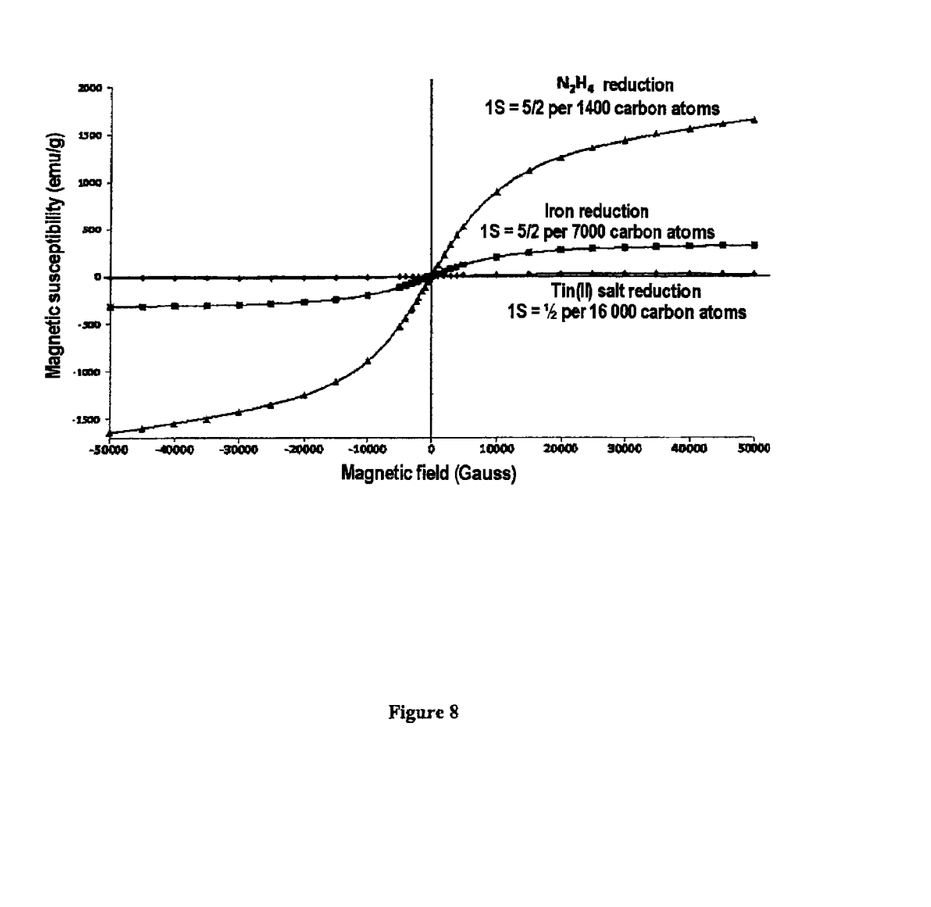

FIG. 8 shows the characterization of the graphene prepared according to the process of Example 1 of the invention by magnetic analysis—measurement of the magnetic moments per unit mass by SQUID magnetometry. In this figure, the magnetic moment per unit mass (or magnetic susceptibility) expressed in emu/g of several types of samples at 1.8 Kelvin (y-axis) is represented as a function of the magnetic field expressed in Gauss (x-axis).

The samples of graphene obtained via the "standard" processes with hydrazine all show a large magnetic moment, corresponding to the presence of manganese(II) ions in the samples. It is possible to quantify these purities to a level of about one manganese(II) ion per 1400 carbon atoms.

The samples obtained by reaction with iron are about five times less magnetic than the preceding samples, which corresponds to about one iron(III) ion per 7000 carbon atoms.

Finally, the measurements taken with the graphene obtained according to the process of the invention show a magnetism about a hundred times lower than that of the samples of the hydrazine process. Furthermore, examination of the curves shows that, in this case, the measured magnetic moment corresponds to spins ½, i.e. to carbon-based paramagnetic species at a level of about 1 spin ½ per 16 000 carbon atoms. In the light of this amount, the carbon-based paramagnetic species encountered in the samples of graphene prepared according to the process of the invention probably correspond to the graphene conduction electrons. Thus, it appears that the samples of graphene obtained according to the process of the invention do not contain any trace of paramagnetic metal elements. Thus, they lend themselves particularly well to graphene magnetism or magnetic doping studies.

EXAMPLES

Example 1

The graphene oxide (GO) used is synthesized from natural graphite powder (Bay Carbon) or synthetic graphite powder (Nano Armor) according to the modified Hummer procedure described by O. C. Compton and S. T. Nguyen, *Small*, 2010, 6, 711-723.

The hydrochloric acid and the chemical products required for performing this process were purchased from the company Sigma Aldrich, and used as obtained.

The machine used for the ultrasonic dispersion steps is supplied by the company Branson (model 2210).

Unless otherwise stated, the reactions are performed at room temperature, i.e. at 20±5° C.

The XPS spectra were recorded on a machine supplied by the company Surface Science Instruments, the infrared spectra were acquired on a Spectrum GX (USA) spectrometer, the Raman spectrometer was supplied by the company Reinshaw, the powder X-ray diffraction spectra were obtained on an X'Pert machine (PANalytical). The TEM images were acquired using a JOEL 3010 microscope. The EPR spectra were acquired on a Brüker EMX spectrometer functioning in the X-ray band equipped with an Oxford Instrument ESR900 cryostat. The magnetism measurements were recorded using a SQUID MPMS magnetometer supplied by the company Qantum Design.

300 mg of GO are dispersed in 300 mL of distilled water (milliQ type) and subjected to sonication for about 1 hour. 3 g of tin(II) chloride are then added and the reaction medium is sonicated for 30 minutes, then 60 mL of concentrated hydrochloric acid (37% by mass) are added with stirring (without sonication). The dispersion is stirred for 1 hour and then left to stand for 6 hours. After adding hydrochloric acid, the solution turns black, which indicates the conversion of GO into graphene. A further 60 mL of concentrated hydrochloric acid (37% by mass) are added to facilitate the removal of the tin salts.

The graphene is separated out by filtration, then washed several times with concentrated hydrochloric acid (37% by mass) (three times 60 mL) and then with water (about 1.5 L) to neutral pH of the washing water (6.5<pH <7.5).

Depending on the case, a final wash with ethanol may facilitate the drying. Finally, the graphene obtained is either redispersed in a suitable solvent such as pyrrolidinone by sonication, or dried under vacuum (vane pump at $10^{-4}$ mmHg).

The graphene thus prepared was characterized by a set of techniques directed toward showing the quality of the final graphene and its main properties, as shown in FIGS. 1 to 6. A comparison of the magnetic properties with syntheses performed according to the procedures described previously was performed as shown in FIGS. 7 and 8.

On the basis of the various analytical techniques, it is clearly seen that the graphene prepared according to the process of the invention does not show any trace of impurities, especially of metal ions, (para)magnetic ions or of organic or mineral impurities, which is never observed with the graphenes prepared according to the known processes.

The invention claimed is:

1. A process for preparing graphene whose degree of contamination with metallic, magnetic, organic and mineral impurities is not more than 0.01% by mass, relative to the total mass of the graphene, the process comprising
    a) reacting a dispersion of graphene oxide (GO) in at least one solvent selected from the group consisting of a solvent having a nonzero dipole moment a mineral acid, and an organic acid, with at least one tin compound and at least one acidic compound, wherein a pH of the dispersion is less than 7, to obtain graphene, and
    b) performing at least one acidic washing at a pH <5 on the graphene obtained in a), to obtain graphene whose degree of contamination with metallic, magnetic, organic and mineral impurities is not more than 0.01% by mass, relative to the total mass of the graphene.

2. The process of claim 1, wherein:
    the solvent having a nonzero dipole moment is selected from the group consisting of water, pyrrolidinone, a $C_1$-$C_{12}$ alkylpyrrolidinone, octylpyrrolidinone, dimethylformamide (DMF), dimethylacetamide, dimethyl sulfoxide (DMSO), acetonitrile, tetrahydrofuran (THF), and hexamethylphosphoramide (HMPA);
    the mineral acid is selected from the group consisting of hydrochloric acid, sulfuric acid, nitric acid, and perchloric acid; and
    the organic acid is selected from the group consisting of formic acid, lactic acid, benzoic acid, methanesulfonic acid, para-toluenesulfonic acid (PTSA), trifluoroacetic acid, trichloroacetic acid, α-naphthol, and picric acid.

3. The process of claim 1, wherein the solvent in a) is water.

4. The process of claim 1, wherein a graphene oxide (GO) concentration in the dispersion is between $1\times10^{-4}$ and $1\times10^3$ g/L, limits inclusive.

5. The process of claim 1, wherein the tin compound is at least one member selected from the group consisting of:
    tin metal; and
    a tin(II) salt selected from the group consisting of tin chloride, tin sulfate, tin nitrate, tin perchlorate, tin tetraphenylborate, tin phosphate, tin acetate, and tin oxalate.

6. The process of claim 1, wherein an amount of tin compound is from 0.1 to 5 equivalents, limits inclusive, relative to an amount of oxygen to be removed from the graphene oxide.

7. The process of claim 1, wherein the acidic compound is at least one member selected from the group consisting of:
    a mineral acid selected from the group consisting of hydrochloric acid, sulfuric acid, nitric acid, perchloric acid, and phosphoric acid; and
    an organic acid selected from the group consisting of formic acid, lactic acid, benzoic acid, methanesulfonic acid, para-toluenesulfonic acid (PTSA), trifluoroacetic acid, trichloroacetic acid, α-naphthol, and picric acid.

8. The process of claim 1, wherein the acidic compound is used pure or diluted as an aqueous solution to a concentration of at least 0.1 mol·$L^{-1}$.

9. The process of claim 1, wherein the pH of the dispersion in a) is less than 5.

10. The process of claim 1, wherein the washing in b) is performed at a pH <3.

11. The process of claim 1, wherein in a), the reaction occurs at a temperature between 0° C. and a reflux temperature of the solvent.

12. The process of claim 1, wherein a reaction time in a) is from 1 minute to 72 hours, limits inclusive.

13. The process of claim 1, wherein the reacting in a) is performed chemically or electrochemically.

14. The process of claim 1, wherein the acidic washing in b) is performed with a mineral acid selected from the group consisting of hydrochloric acid, sulfuric acid, nitric acid, perchloric acid, and phosphoric acid.

15. The process of claim 1, wherein the degree of contamination of the graphene with metallic, magnetic, organic and mineral impurities is not more than 0.001% by mass, relative to the total mass of the graphene.

16. The process of claim 1, wherein the degree of contamination of the graphene with metallic, magnetic, organic and mineral impurities is not more than 0.0001% by mass, relative to the total mass of the graphene.

17. The process of claim 1, wherein the graphene obtained by the process is in the form of a powder having a density <100 mg·mL$^{-1}$.

18. The process of claim 15, wherein the graphene obtained by the process is in the form of a powder having a density <100 mg·mL$^{-1}$.

* * * * *